(12) United States Patent
Ramanujam et al.

(10) Patent No.: US 8,787,379 B2
(45) Date of Patent: Jul. 22, 2014

(54) DESTINATION-BASED VIRTUAL CHANNEL ASSIGNMENT IN ON-CHIP RING NETWORKS

(75) Inventors: Rohit Sunkam Ramanujam, Santa Clara, CA (US); Sailesh Kumar, San Jose, CA (US); William Lynch, Los Altos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 149 days.

(21) Appl. No.: 13/342,683

(22) Filed: Jan. 3, 2012

(65) Prior Publication Data

US 2012/0195314 A1    Aug. 2, 2012

Related U.S. Application Data

(60) Provisional application No. 61/438,808, filed on Feb. 2, 2011.

(51) Int. Cl.
| | | |
|---|---|---|
| *H04L 12/28* | (2006.01) | |
| *G06F 15/78* | (2006.01) | |
| *H04L 12/46* | (2006.01) | |
| *H04L 12/42* | (2006.01) | |
| *H04L 12/56* | (2006.01) | |

(52) U.S. Cl.
CPC ........ *G06F 15/7825* (2013.01); *H04L 12/4633* (2013.01); *H04L 12/42* (2013.01); *H04L 45/122* (2013.01)
USPC .......................................... 370/392

(58) Field of Classification Search
CPC ....... H04L 45/28; H04L 12/437; H04L 3/085; H04L 2203/006; H04L 47/10; H04L 47/15; H04L 47/70; H04L 5/14; H04L 12/6418; H04L 12/56; H04L 29/0653; H04L 49/309; H04L 45/74; H04L 2012/5652
USPC ......... 370/230, 353, 406, 221–222, 295, 389, 370/392, 395; 375/295; 395/182.02
See application file for complete search history.

(56) References Cited

U.S. PATENT DOCUMENTS

| | | | | |
|---|---|---|---|---|
| 5,898,826 | A * | 4/1999 | Pierce et al. | 714/4.2 |
| 6,563,831 | B1 | 5/2003 | Dally et al. | |
| 7,555,001 | B2 * | 6/2009 | Coppola et al. | 370/425 |
| 8,014,387 | B2 * | 9/2011 | Arimilli et al. | 370/353 |
| 2004/0213248 | A1 * | 10/2004 | Okuda et al. | 370/395.1 |
| 2007/0140240 | A1 * | 6/2007 | Dally et al. | 370/389 |
| 2007/0140280 | A1 * | 6/2007 | Rhim et al. | 370/406 |
| 2011/0033007 | A1 * | 2/2011 | Zerbe et al. | 375/295 |
| 2013/0028083 | A1 * | 1/2013 | Yoshida et al. | 370/230 |

* cited by examiner

*Primary Examiner* — Kwang B Yao
*Assistant Examiner* — Syed M Bokhari
(74) *Attorney, Agent, or Firm* — Conley Rose, P.C.; Grant Rodolph; Rayhao A. Chung

(57) ABSTRACT

An apparatus comprising a plurality of nodes and a plurality of links connecting the nodes in a ring topology, wherein a first node from among the plurality of nodes is coupled to a first link from among the plurality of links, wherein the first link comprises a plurality of virtual channels, and wherein each of the plurality of virtual channels is assigned to provide service to a unique one of the plurality of nodes.

17 Claims, 7 Drawing Sheets

DESTINATION-BASED VIRTUAL CHANNEL ASSIGNMENT IN ON-CHIP RING NETWORKS

CROSS-REFERENCE TO RELATED APPLICATIONS

The present application claims priority to U.S. Provisional Patent Application 61/438,808, filed Feb. 2, 2011 by Rohit Sunkam Ramanujam, et al., and entitled "Destination-Based Virtual Channel Assignment in On-Chip Ring Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As transistor and other component sizes become smaller and manufacturing techniques continue to improve, more functionality is being placed on single integrated circuits, or chips. The term system on a chip (SoC) generally refers to integrating all the functionality of a computer or other complex electronic system onto a single chip. A SoC may comprise one or more memories, processors, or input/output ports, all integrated into a single chip. One way of allowing various components of a SoC to communicate is to use an on-chip network, sometimes referred to as a network-on-chip. An on-chip network is intended to replace conventional ways of communicating between electronic components in a complex system, such as conventional bus and crossbar interconnections.

Ring networks may be an attractive option for on-chip networks because ring networks are of relatively low complexity. A node in a ring network may divide channel resources on a link into virtual channels. Virtual channels are traditionally used to bypass blocked traffic in a network thereby improving link utilization. However, in on-chip networks, in which buffering is limited, the throughput and link utilization may be drastically reduced if one or more of the network nodes are oversubscribed and its packet queues back up and consume a large fraction of the available buffers. Virtual channels may be divided into a number of different virtual channel classes with different priorities. The impact of an oversubscribed network node remains, however, even with the use of virtual classes because a flit available for transmission is typically allowed to reserve any available virtual channel without restriction.

SUMMARY

In one aspect, the invention includes an apparatus comprising a plurality of nodes and a plurality of links connecting the nodes in a ring topology, wherein a first node from among the plurality of nodes is coupled to a first link from among the plurality of links, wherein the first link comprises a plurality of virtual channels, and wherein each of the plurality of virtual channels is assigned to provide service to a unique one of the plurality of nodes.

In another aspect, the invention includes a method comprising assigning a flit to a virtual channel corresponding to a destination node and transmitting the flit via the virtual channel, wherein the steps are performed in a first node in a plurality of nodes on a single chip.

In yet another aspect, the invention includes an apparatus comprising a plurality of nodes and a plurality of links connecting the nodes in a ring topology, wherein a first node from among the plurality of nodes is directly connected to a first link from among the plurality of links, wherein the first link comprises a plurality of virtual channels, wherein a first virtual channel from the plurality of virtual channels is assigned to provide service to a first cluster of the plurality of nodes, and wherein the first cluster comprises at least two nodes.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for assigning link resources to virtual channels in ring networks, especially on-chip ring networks. Virtual channels may be assigned to provide service to destination nodes such that there may be a one-to-one correspondence between virtual channels on a link and destination nodes. Traffic intended for a destination node may be transmitted via the virtual channel assigned to the destination node. Such an assignment of virtual channels to destination nodes may be referred to as destination-based virtual channel assignment. Destination-based virtual channel assignment prevents flits destined for one network node from blocking flits destined for a different destination node, thereby reducing latency and average flit transit times. Systems and methods are also disclosed for utilizing clusters of nodes in ring networks in the assignment of resources to virtual channels. Virtual channels may be assigned to provide service to destination clusters such that there may be a one-to-one correspondence between virtual channels on a link and destination clusters. Clustering reduces complexity, as fewer virtual channels may be needed, at the expense of increased latency, as nodes within a cluster must share a virtual channel. The methods and systems disclosed herein apply not only to on-chip ring networks, but also to ring networks generally.

Figure 1:
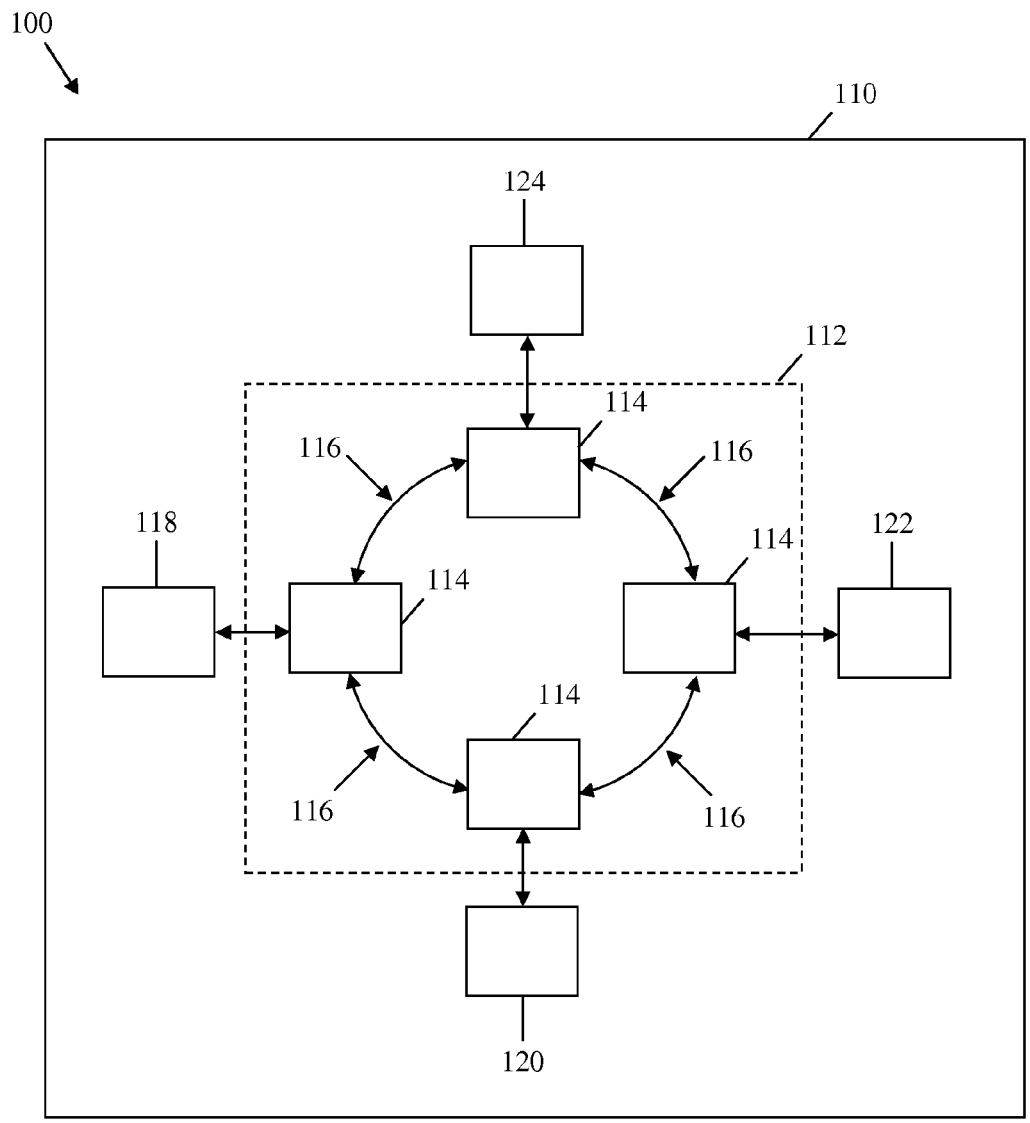
FIG. 1 is a schematic diagram of an embodiment of a system on a chip.

An on-chip network may be configured to provide communication capability between various components that reside in a single chip. FIG. 1 is a schematic diagram of an embodiment of a system on a chip (SoC) 100 with an on-chip network 112. Specifically, the SoC 100 comprises an on-chip network 112 comprising a plurality of nodes 114. The on-chip network 112 may be configured to provide communications capability between components 118, 120, 122, and 124 via the nodes 114, where the on-chip network 112 and components 118, 120, 122, and 124 are located on a single chip 110. While four components 118, 120, 122, and 124 are illustrated in FIG. 1, it will be appreciated that an on-chip network 112 may connect any number and/or type of components 118, 120, 122, and 124. Further, although FIG. 1 shows four nodes 114, an on-chip network 112 may comprise any number of nodes 114 and links 116.

The nodes 114 and links 116 in on-chip network 112 may be arranged in any topology. For example, the nodes 114 and links 116 may be arranged in a ring topology, which may also be referred to as a ring network, as illustrated in FIG. 1. A ring network may refer to a network topology in which each node connects to exactly two other nodes. As another example, the nodes 114 and links 116 may be arranged in a mesh topology, which may also be referred to as a mesh network. A mesh network may refer to a network topology in which each node is directly connected to every other node.

The nodes 114 may be any devices that promote routing of flits within the on-chip network 112. At least some of the nodes may break an incoming packet (e.g. an Internet Protocol (IP) packet or Ethernet frame) into units of information known as flow control digits, or flits, if such is not done by the components 118, 120, 122, and 124, and/or reassemble the flits into an outgoing packet if such is not done by the components 118, 120, 122, and 124. In addition, the nodes 114 may perform flit routing in that they receive flits and determine which of a plurality of virtual channels on which to transmit the flits. In a similar manner, the nodes 114 may perform packet routing in that they receive packets and determine which of a plurality of virtual channels on which to transmit the packets. As part of the routing, the nodes 114 may arbitrate two flits or flits competing for a common resource (e.g. a virtual channel in a link 116). To perform these various functions, each node 114 may include a processor that is in communication with a memory, such as a read only memory (ROM), a random access memory (RAM), or any other type of memory. Each processor may be a general-purpose processor or may be an application-specific processor. Alternatively, at least some of the nodes 114 may be implemented with no local memory, but have access to an external memory that may be located on another part of the SoC 100 and perhaps shared by other nodes 114. Finally, at least some of the nodes 114 may be implemented with no local memory and no memory access.

As discussed above, flits may be formed by segmenting packets, e.g., Ethernet packets or IP packets, that enter an on-chip network. A flit that enters an on-chip network may also be referred to as being injected into an on-chip network. Referring to FIG. 1 as an exemplary example, a component, such as component 122, may transmit a packet to corresponding node 114. Node 114 may be configured to receive the packet and segment the packet into smaller units of information. Alternatively, a component, such as component 122, may segment a packet into smaller units. Each unit of information may be placed into a flit. There may be different types of flits, such as head flits, body flits, and tail flits. A packet that is segmented into smaller units may be distributed over a head flit, one or more body flits, and a tail flit, and these flits may maintain a specified order (e.g. head first, then body, then tail) as they are routed and/or processed on the chip 110. A head flit may be used to acquire resources in an on-chip network for the series of flits corresponding to a packet, and a tail flit may be used to release resources. A head flit may also comprise the packet's header (e.g. the packet's destination address, source address, etc.), and may contain some of the packet payload, whereas the body and tail flits generally do not contain any of the packet's header. In cases where the packet's header is particularly long, the packet's header may be included in the head flit and some of the body flits, but not the remaining body flits or the tail flit. Any scheme for assigning information to flits is within the scope of this application. Further, on-chip networks that transmit and receive packets, in addition to or instead of flits, are also within the scope of this application. For convenience, the remainder of the application addresses flits, but the application is also applicable to packets.

The links 116 may be any devices that carry flits between nodes 114 and/or components 118, 120, 122, and 124. The links 116 are typically electrical links, but may be optical or wireless links. Although links 116 are generally bidirectional, the links 116 instead may be unidirectional. At least some of the links 116 may be divided into a plurality of virtual channels, for example, by segmenting available link 116 resources (e.g. time and/or frequency) into a plurality of slots (e.g. time slots and/or frequency slots) that carry the flits. A virtual channel may extend between only two adjacent nodes or may extend through multiple nodes.

The components 118, 120, 122, and 124 may be any type of devices that process the flits. Generally, the components 118, 120, 122, and 124 may be devices that perform some function that is more specialized than the functions performed by the nodes. For example, the components 118, 120, 122, and 124 may include memories, processors, input/output (I/O) devices such as ingress or egress ports, or any other electronic components. While the nodes 114 may comprise processors and/or memories, the capacity and/or throughput of the processors and/or memories in the components 118, 120, 122, and 124 typically greatly exceed those of the nodes 114 such that it would be not be possible or practical for the nodes 114 to perform the functions performed by the components 118, 120, 122, and 124. In cases where one of the components 118, 120, 122, and 124 is an ingress port, it may remove protocol layers from an incoming packet (e.g. an IP packet or Ethernet frame) and/or break the incoming packet into flits, if such is not done by the nodes 114. In cases where one of the components 118, 120, 122, and 124 is an egress port, it may reassemble the flits into an outgoing packet (e.g. an IP packet or Ethernet frame), and/or add protocol layers to the outgoing packet, if such is not done by the nodes 114.

Figure 2:
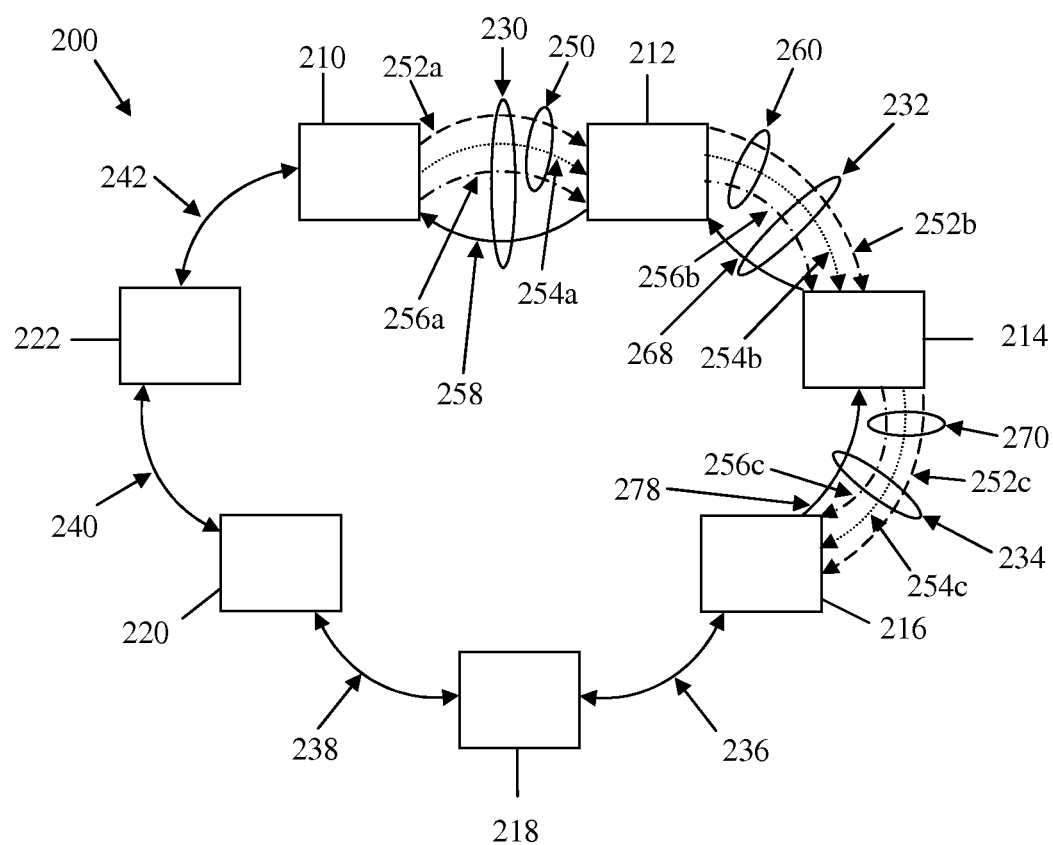
FIG. 2 is a schematic diagram of an embodiment of a ring network.

FIG. 2 illustrates an embodiment of a ring network 200 with virtual channels. The ring network 200 comprises seven nodes 210, 212, 214, 216, 218, 220, and 222 connected by bidirectional links 230, 232, 234, 236, 238, 240, and 242. For example, link 230 couples node 210 to node 212, link 232 couples node 212 to node 214, and link 234 couples node 214 to node 216. As such, flits may be transmitted from node 210 to node 212 and from node 212 to node 210 over link 230, for example. The ring network 200 may be implemented as an on-chip network.

The length of a route from a source to destination may be measured in number of hops, which may refer to the number of links between a source node and a destination node. For example, the length of the route from node 210 to node 216 is three hops. Shortest-path routing may be employed in a ring network, such as ring network 200, to ensure that flits travel the shortest route possible, i.e., fewest hops, from a source node to a corresponding destination node. For example, shortest-path routing for flits residing in node 210 and destined for nodes 212, 214, or 216 dictates that flits should travel in the clockwise direction, not the counterclockwise direction. On the other hand, flits at node 210 destined for nodes 218, 220, or 222 should travel in the counterclockwise direction using shortest-path routing.

Bidirectional link 230 comprises unidirectional links 250 and 258. Although shown as separate unidirectional links for convenience, unidirectional links 250 and 258 may be part of a single wire, a single optical fiber, or other single piece of material, or a wireless link. Virtual channels 252a, 254a, and 256a corresponding to unidirectional link 250 are illustrated. Unidirectional link 258 also may be divided into virtual channels, although virtual channels for link 258 are not illustrated. Each virtual channel may be used for flits at node 210 intended for a different destination node. Shortest-path routing may be employed so that flits residing at 210 and traveling in the clockwise direction may be destined for one of only three nodes—nodes 212, 214, or 216. Node 210 may divide unidirectional link 250 into three virtual channels, one for each of the possible destination nodes in the clockwise direction. That is, traffic destined for node 216 may be transmitted over virtual channel 252a (indicated by a dashed line); traffic destined for node 214 may be transmitted over virtual channel 254a (indicated by a dotted line); and traffic destined for node 212 may be transmitted over virtual channel 256a (indicated by a dot-dashed line). In this manner, there may be a one-to-one correspondence between virtual channels and destination nodes.

Likewise, bidirectional link 232 comprises two unidirectional links 260 and 268. The virtual channels 252b, 254b, and 256b corresponding to unidirectional link 260 are illustrated. Each virtual channel for unidirectional link 260 may be intended for a different destination node for flits traveling in a clockwise direction. Shortest-path routing may be employed so that flits residing at 212 and traveling in a clockwise direction may be destined for one of only three nodes—nodes 214, 216, or 218. Traffic destined for node 218 may be transmitted over virtual channel 252b (indicated by a dashed line); traffic destined for node 216 may be transmitted over virtual channel 254b (indicated by a dotted line); and traffic destined for node 214 may be transmitted over virtual channel 256b (indicated by a dot-dashed line).

The remaining links 234, 236, 238, 240, and 242 in the clockwise direction may be divided into virtual channels in a similar fashion. For example, bidirectional link 234 comprises two unidirectional links 270 and 278. Unidirectional link 270 may be divided into three virtual channels for traffic destined for different nodes—traffic destined for node 220 may be transmitted over virtual channel 252c (indicated by a dashed line); traffic destined for node 218 may be transmitted over virtual channel 254c (indicated by a dotted line); and traffic destined for node 216 may be transmitted over virtual channel 256c (indicated by a dot-dashed line).

Virtual channel labeling may be useful in routing of packets in a network using destination-based virtual channel assignment. A virtual channel assigned to a destination k hops away may be labeled as VC-k. This labeling may simplify assignment of flits to virtual channels at intermediate nodes along a route in an on-chip network because all that needs to be done is to decrement the label for a received flit by one in assigning a flit to a virtual channel. For example, using ring network 200 as an exemplary embodiment, a flit received at node 212 via VC-2 (assigned to 254a and indicated by a dotted line) implies that transmitting node 210 is two hops away from the flit's destination node. Thus, the label may be decremented by one, and the flit may be assigned to VC-1 at node 212 and transmitted over VC-1 (assigned to 256b and indicated by a dot-dashed line), as the flit is one hop away from its destination.

A buffer may be assigned in a node to each outgoing virtual channel so that flits for one destination are placed into a buffer corresponding to the destination's virtual channel. By assigning virtual channels to destination nodes in a one-to-one correspondence, if a single destination is oversubscribed, traffic backs up only in one buffer without congesting the remaining virtual channels. This property may be useful in applications in which a network node may temporarily receive requests at a rate faster than the rate at which the node can service them, i.e., the packet arrival rate may be higher than the packet service rate.

Figure 3:
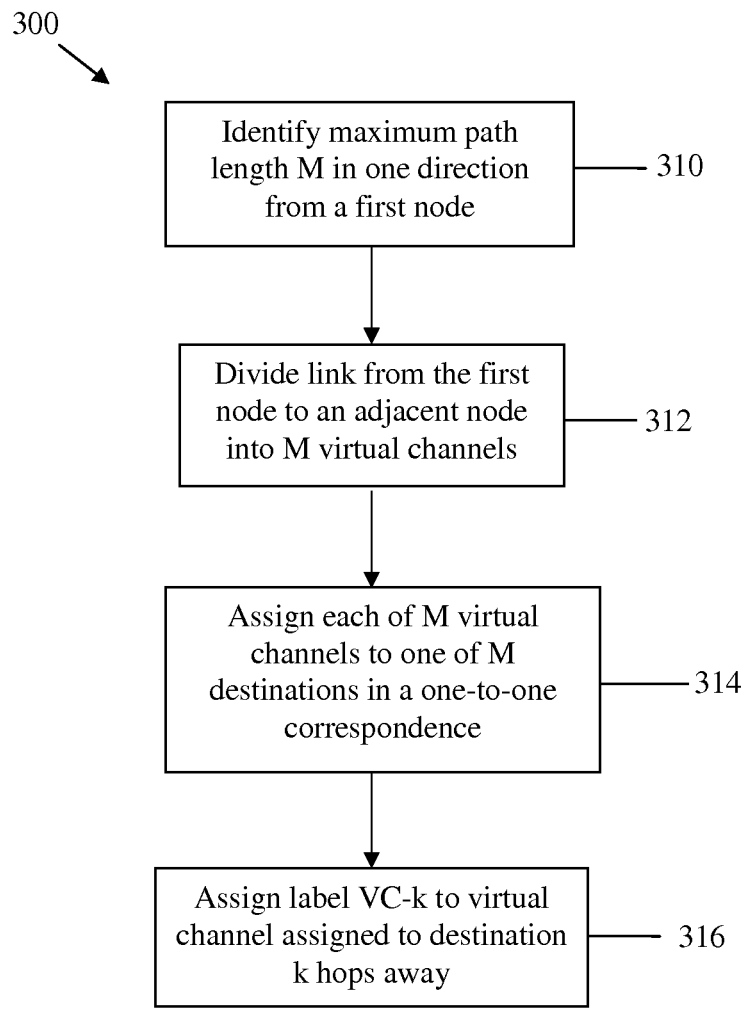
FIG. 3 is a flowchart of an embodiment of a method for assigning virtual channels to destinations.

FIG. 3 illustrates a flowchart of an embodiment of a method 300 for assigning virtual channels to destinations. The method 300 may be implemented by any node in the on-chip network and may result in virtual channel assignments as described above with respect to the ring network in FIG. 2.

In step 310, a maximum path length M in one direction from a node is identified using shortest-path routing. For example, the maximum path length M for flits residing at node 210 in FIG. 2 and traveling in the clockwise direction is equal to three. By way of another example, if a ring network of N nodes was comprised only of unidirectional links, instead of bidirectional links, the maximum path length of such a network would be N−1. After the maximum path length is identified in step 310, the link from the node to an adjacent node is divided into M virtual channels in step 312. Returning to the embodiment in FIG. 2 as an example, the unidirectional link 250 from node 210 to node 212 is divided into three virtual channels —252, 254, and 256.

After dividing the link into virtual channels in step 312, each of M virtual channels is assigned to provide service to one of M destinations in a one-to-one correspondence in step 314. Returning to the embodiment in FIG. 2 as an example, the three virtual channels 252, 254, and 256 may be assigned to destination nodes 216, 214, and 212, respectively, in a one-to-one correspondence.

Next in step 316, label VC-k may be assigned to the virtual channel assigned to the destination that is k hops away. Returning to the embodiment in FIG. 2 as an example, virtual channel 252a may be assigned label VC-3 because virtual channel 252a may be assigned to node 216, which is three hops away from node 210; virtual channel 254a may be assigned label VC-2 because virtual channel 254a may be assigned to node 214, which is two hops away from node 210; and virtual channel 256a may be assigned label VC-1 because virtual channel 256a may be assigned to node 212, which is one hop away from node 210. The labels VC-1, VC-2, and VC-3 are not unique to node 210 and may be reused at each node.

The steps in 300 may be performed in each node in a ring network, which may be an on-chip ring network. Or a subset of the steps in 300 may be performed in each node. For example, step 310 may be hardcoded into each node as this value may be known before the network is powered up. The remaining steps 312, 314, and 316 may be performed in each node during operation.

Figure 4:
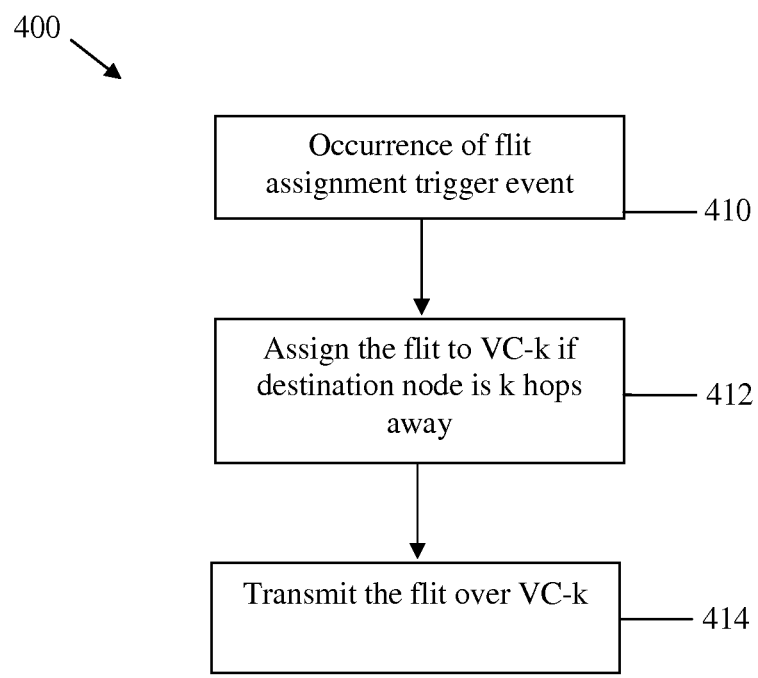
FIG. 4 is a flowchart of an embodiment of a method for assigning flits to virtual channels.

A method 400 for assigning flits to virtual channels is presented in FIG. 4. The method 400 may be implemented in any node in an on-chip network that is directly connected to a component, such as a memory or processor in a SoC, and therefore receives information from that component. The method may be used in tandem with the method 300 for assigning virtual channels to destinations illustrated in FIG. 3.

A flit assignment trigger event occurs in step 410. The flit assignment trigger event results in a flit being available to be transmitted at a node. A flit assignment trigger event may be any event that occurs at a node in a sequence of events that results in a flit being available at the node that is not its final destination node. A flit assignment trigger event may be the reception of the flit at an ingress port at the node, or it may be the placement of the flit in a service queue. The flit may be received at a node from a component in a SoC, such as a processor. The flit may be destined for another component in a SoC, and must be routed through at least one other node in an on-chip network to reach the flit's destination node. The flit's destination node may be a final node in an on-chip ring network before being transmitted to a component outside the ring as a destination.

Next in step 412, the flit is assigned to a virtual channel corresponding to VC-k if the final destination node is k hops away. This step may work in tandem with the method presented in FIG. 3. Referring to FIG. 2 as an exemplary embodiment, as discussed previously virtual channel 252 may be assigned to node 216, and virtual channel 252 may be assigned label VC-3 because node 216 is three hops away from node 210. A flit at node 210 intended for destination 216 may be assigned to virtual channel corresponding to VC-3. Next in step 414, the flit is transmitted over virtual channel VC-k. Using the example discussed above, the flit at node 210 intended for destination 216 may be transmitted over virtual channel VC-3.

Figure 5:
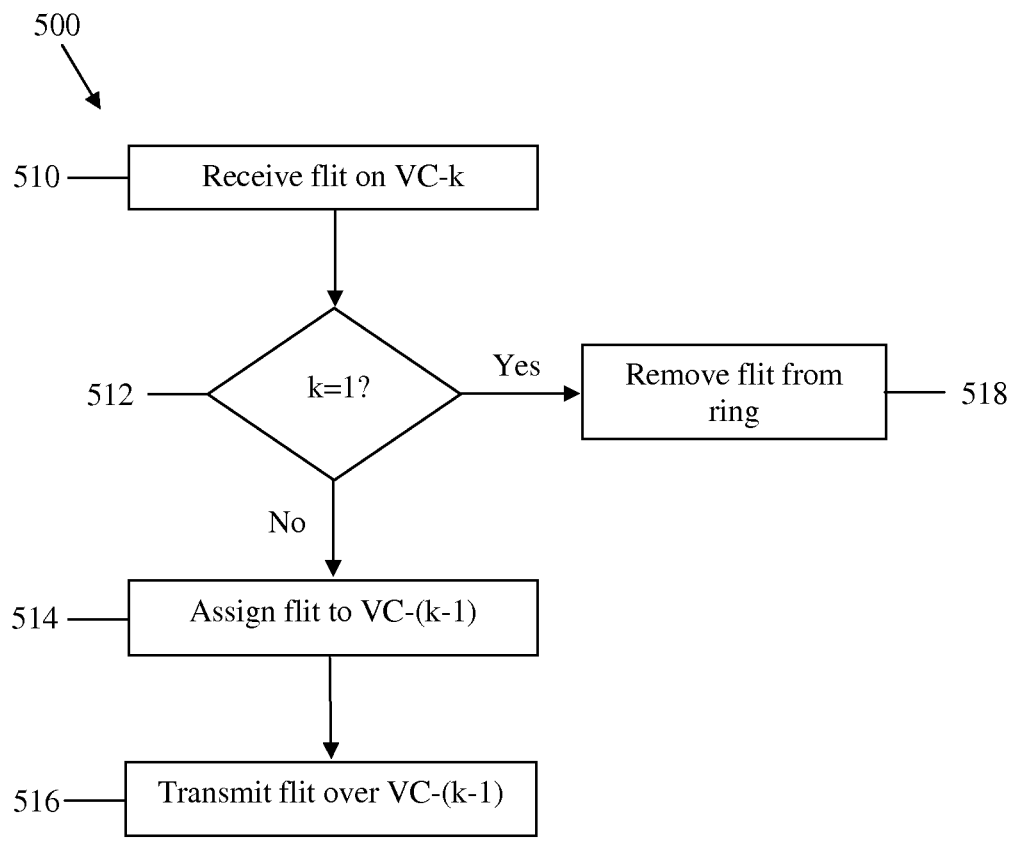
FIG. 5 is a flowchart of an embodiment of a method for routing flits on virtual channels.

FIG. 5 shows a flowchart of an embodiment of a method 500 for routing flits on virtual channels. The method may be implemented in a node in a ring network, which may be an on-chip ring network. In step 510, a flit is received on VC-k. The flit may be received at a first node from a second node in an on-chip network. The second node may be k hops from the flit's final destination node. In step 512 a determination is made whether k is equal to one. If k is equal to one, the method proceeds to step 518. In step 518, the flit is removed from the ring network because it has reached its final destination.

If k is not equal to one in step 512, the method proceeds to step 514. In step 514, the flit is assigned to VC-(k−1). Using the flit described in the previous paragraph as an example, the flit is now k−1 hops from its final destination, so the flit may be assigned to VC-(k−1), as may be all flits destined for the destination node k−1 hops away. Finally, in step 516 the flit assigned in step 514 may be transmitted on VC-(k−1). The flit may be transmitted to the next node on the route to the destination.

The methods 400 and 500 result in a flit being transmitted over a virtual channel. The method 400 as illustrated in FIG. 4 applies to flits received directly from a component, such as a memory or processor, in a SoC, whereas the method 500 as illustrated in FIG. 5 applies to flits received from another node in an on-chip network.

Although one virtual channel per destination node may be effective in networks with a relatively small number of nodes, assigning one virtual channel per destination may not scale well as the number of nodes in a network grows. This is because the number of virtual channels, and the corresponding number of buffers, increases linearly with the number of nodes. One way to address these problems is to divide nodes in a network into separate subsets or groups with two or more nodes per subset, referred to as a cluster. For the purposes of dividing a link into virtual channels, each destination cluster, rather than each destination node, may be assigned a virtual channel. Nodes within a cluster may share a virtual channel. This technique may be used to tradeoff performance for scalability and cost. Nodes within a cluster may share a virtual channel, and the effects of oversubscription of one node in the cluster may affect other nodes in the same cluster, but nodes of different clusters may still be isolated.

Figure 6:
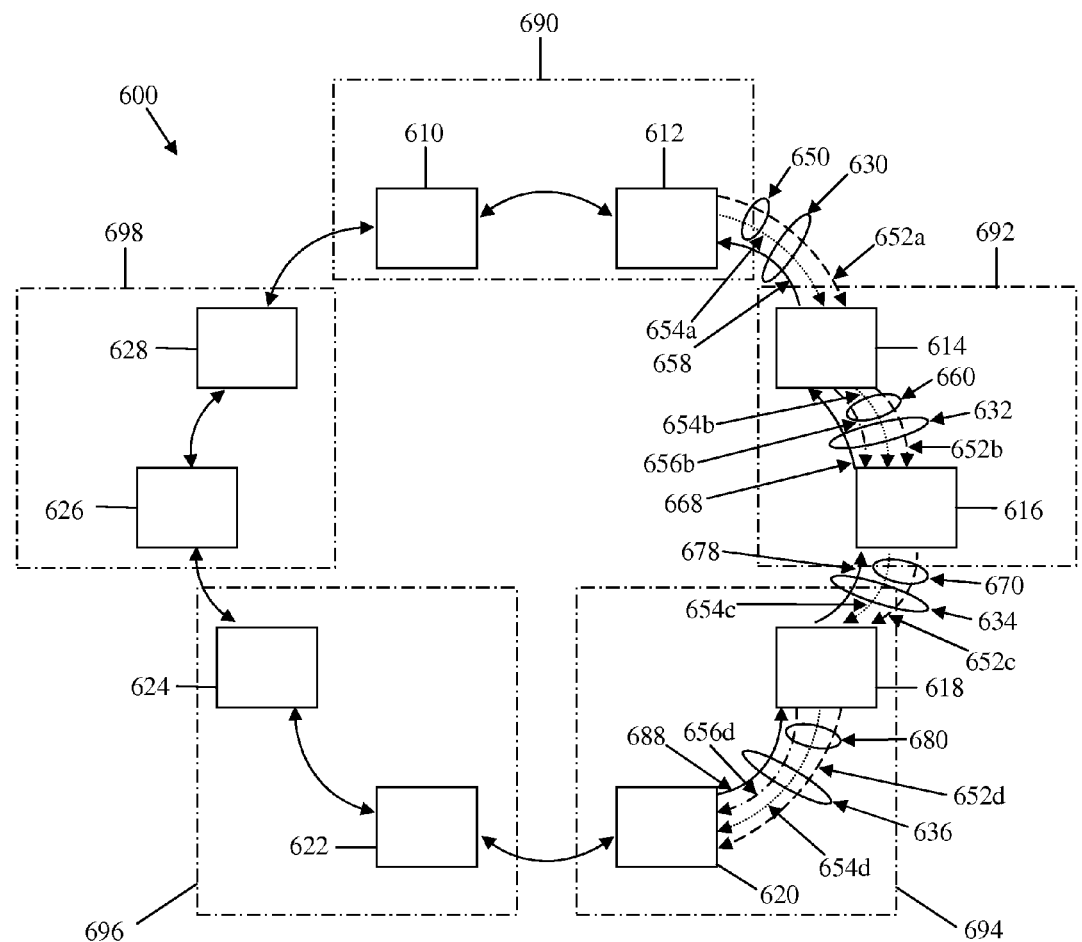
FIG. 6 is a schematic diagram of an embodiment of a ring network with clusters of nodes.

An embodiment of a network of clusters is illustrated in FIG. 6, which is a schematic diagram of an embodiment of a ring network with clusters of nodes. The ring network 600 comprises ten nodes—nodes 610, 612, 614, 616, 618, 620, 622, 624, 626, and 628—connected by bidirectional links. Examples of bidirectional links are links 630, 632, 634, and 636. For example, link 630 couples node 612 to node 614. That is, flits may be transmitted from node 612 to 614 and from node 614 to node 612 over link 630. The ring network 600 may be implemented as an on-chip network. A ring network 600 with ten nodes is used for illustration and not to suggest that clustering must be used in networks comprising a certain number of nodes.

The nodes of network 600 may be divided into clusters. Clusters generally do not overlap so that no given node resides in more than one cluster. For example, the ten nodes of network 600 may be divided into five clusters, each of which comprises a pair of nodes. One possible set of clusters is illustrated in FIG. 6 as clusters 690, 692, 694, 696, and 698. Other sets of clusters are possible. For example, it is not necessary that each cluster include the same number of nodes. Any division of a network into clusters is within the scope of this application.

As discussed earlier, a link may be divided into a number of virtual channels, with each virtual channel assigned to a different destination node. If clusters are used, virtual channels may instead be assigned to clusters, as opposed to individual nodes. Virtual channels may be used to route a flit to a destination cluster, with nodes within a destination cluster sharing a virtual channel. A path length may be a number of cluster-to-cluster hops between a source node and a destination node. A shortest path may be a path between a given source node and a given destination node with a minimum path length. Shortest-path routing may refer to selecting a shortest path for a flit based on a number of cluster-to-cluster hops.

FIG. 6 illustrates the assignment of virtual channels to destination clusters in ring network 600 according to one embodiment. Bidirectional link 630 comprises unidirectional links 650 and 658. As discussed earlier, a bidirectional link, such as 630, may be implemented any of a number of ways, and any bidirectional link implementation is within the scope of this application. Virtual channels 652a and 654a, corresponding to unidirectional link 650 are illustrated. Each virtual channel may be used for flits at node 612 intended for a different destination cluster. Shortest-path routing based on cluster-to-cluster hops may be employed so that flits residing at node 612 and traveling in the clockwise direction may be destined for one of only two clusters—cluster 692 or 694. Node 612 divides unidirectional link 650 into two virtual channels, one for each of the possible destination clusters in the clockwise direction. That is, traffic destined for either of nodes 618 or 620 in cluster 694 may be transmitted over virtual channel 652a (indicated by a dashed line), and traffic destined for either of nodes 614 or 616 in cluster 692 may be transmitted over virtual channel 654a (indicated by a dotted line). In this manner, there may be a one-to-one correspondence between virtual channels and destination clusters.

Likewise, links between clusters are divided into virtual channels in a similar manner. For example, unidirectional link 670 may be divided into two virtual channels for traffic destined for different destination clusters in the clockwise direction—traffic destined for either of nodes 622 or 624 in cluster 696 may be transmitted over virtual channel 652c (indicated by a dashed line), and traffic destined for either of nodes 618 or 620 may be transmitted over virtual channel 654c (indicated by a dotted line). Unidirectional link 678 may be divided similarly into virtual channels in the counterclockwise direction.

In this manner, flits may be transmitted from one cluster to another. One tradeoff with using virtual channel assignment based on clusters is that a virtual channel does not uniquely identify a destination node. Stated another way, all the nodes in a cluster may share a virtual channel. In order to ensure that a flit arrives at its destination, a flit may be provided with a destination field in which destination identification information may be placed.

Further, communications between nodes within a cluster takes place over a virtual channel designated for nodes within the cluster. Links between nodes within a cluster may optionally have one additional virtual channel compared with links that connect one cluster to another cluster. By way of example, node 614 may be configured to receive flits via virtual channels 652a and 654a, and node 614 may be configured to transmit flits via virtual channels 652b, 654b, and 656b. Each virtual channel may be used for flits at node 614 intended for a different destination cluster. Node 614 may divide unidirectional link 660 into three virtual channels, one for each of the possible destination clusters in the clockwise direction. That is, traffic destined for either of nodes 622 or 624 in cluster 696 may be transmitted over virtual channel 652b (indicated by a dashed line); traffic destined for either of nodes 618 or 620 in cluster 694 may be transmitted over virtual channel 654b (indicated by a dotted line); and traffic destined for node 616 in cluster 692, the same cluster as node 614, may be transmitted over virtual channel 656b (indicated by a dot-dashed line). Unidirectional link 668 may be divided similarly into virtual channels in the counterclockwise direction.

Similarly, node 618 may divide unidirectional link 680 into three virtual channels, one for each of the possible destination clusters in the clockwise direction. That is, traffic destined for either of nodes 626 or 628 in cluster 698 may be transmitted over virtual channel 652d (indicated by a dashed line); traffic destined for either of nodes 622 or 624 in cluster 696 may be transmitted over virtual channel 654d (indicated by a dotted line); and traffic destined for node 620 in cluster 694, the same cluster as node 618, may be transmitted over virtual channel 656d (indicated by a dot-dashed line). In this manner, there may be a one-to-one correspondence between virtual channels and destination clusters, where the destination cluster may be the same cluster as the transmitting cluster. Unidirectional link 688 may be divided similarly into virtual channels by node 620 in the counterclockwise direction.

Virtual channel labeling may be useful in routing of packets in a ring network using clusters and destination-based virtual channel assignment. A virtual channel assigned to a destination cluster k hops away may be labeled as VC-k. This labeling may simplify assignment of flits to virtual channels at intermediate nodes at cluster edges along a route in an on-chip network because all that needs to be done is to decrement the label for a received flit by one in assigning a flit to a virtual channel. Only a receiving node at a cluster edge needs to change the virtual channel assignment in rings that use clusters. For example, referring to FIG. 6, node 614 is a receiving node at the edge of cluster 692 in the clockwise direction. A flit received at node 614 on VC-2 (assigned to 652a and indicated by a dashed line) implies that transmitting node 612 was two clusters away from its destination. Thus, the label may be decremented by one, and the flit may be assigned to VC-1 at node 614 and transmitted over VC-1 (link 654b, indicated by a dotted line), as the flit is now one cluster away from its destination. Node 616 is not a receiving node at the edge of cluster 692 in the clockwise direction, so node 616 will receive the flit over VC-1 and also transmit the flit over VC-1 (assigned to 654c and indicated by a dotted line).

Links between nodes within a cluster may optionally use a same number of virtual channels compared with links that connect one cluster to another. For example, unidirectional link 680 may comprise only two virtual channels, with one virtual channel carrying traffic destined for nod 620 as well as nodes in cluster 696. Such a configuration of virtual channels trades off some performance for reduced complexity.

A buffer may be assigned in a node to each outgoing virtual channel so that flits for one destination cluster are placed into a buffer corresponding to the destination cluster's virtual channel. By assigning virtual channels to different destination clusters, if a single destination cluster is oversubscribed, traffic backs up only in one buffer, without congesting the remaining virtual channels. This property may be useful in applications in which a network node may temporarily receive requests at a rate faster than the rate at which the node can service them, i.e., the flit arrival rate may be higher than the flit service rate.

Figure 7:
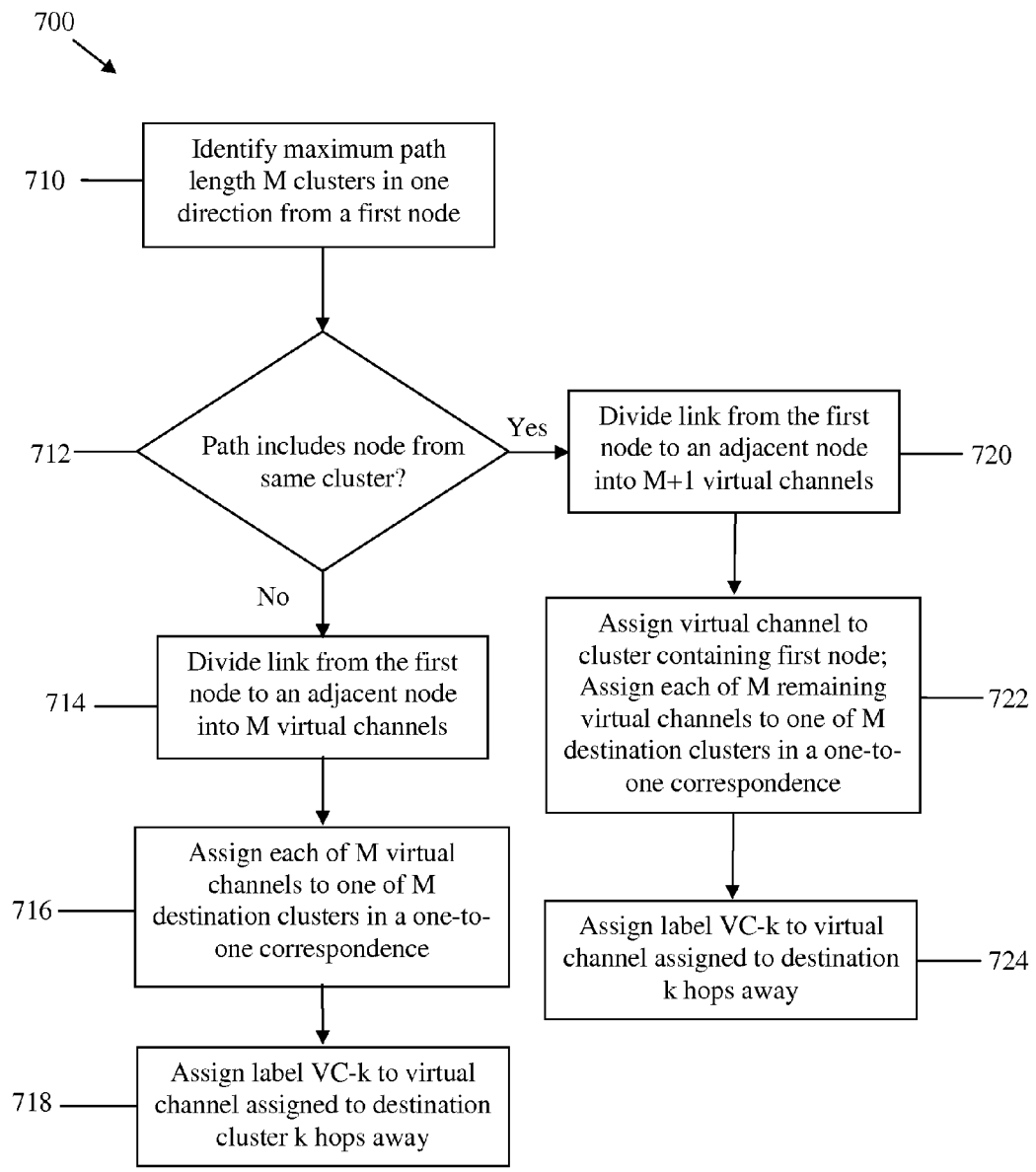
FIG. 7 is a flowchart of an embodiment of a method for assigning virtual channels to destination clusters.

FIG. 7 illustrates a flowchart of an embodiment of method 700 for assigning virtual channels to destination clusters. All of the steps may be performed in a node in a ring network, which may be an on-chip ring network. The method may result in virtual channel assignments as described above with respect to the ring network in FIG. 6.

In step 710, a maximum path length M in one direction from a first node is identified using shortest-path routing. The maximum path length M is the maximum number of cluster-to-cluster hops necessary to reach a destination cluster. For example, the maximum path length M for flits residing at node 612 in FIG. 6 and traveling in the clockwise direction is equal to two. By way of another example, if a ring network comprising N clusters was comprised of unidirectional links, instead of bidirectional links, the maximum path length of such a network is N−1. Next in step 712, a determination is made whether the path from the first node includes nodes from the same cluster as the first node. By way of example, the path from node 614 in the clockwise direction includes node 616 within the same cluster.

If the determination is "yes" at step 712, the process may proceed to step 720. At step 720, the link from the first node to an adjacent node may be divided into M+1 virtual channels. For example, the clockwise link from node 614 may be divided into three virtual channels as illustrated in FIG. 6. Next at step 722, one of the M+1 virtual channels may be assigned to traffic intended for other nodes within the same cluster as the first node. Returning to node 614 in FIG. 6 as an example, virtual channel 666 may be assigned to traffic intended to node 616. Further, at step 722, each of the remaining M virtual channels may be assigned to one of M destination clusters in a one-to-one correspondence. Returning to node 614 in FIG. 6 as an example, virtual channels 662 and 664 may be assigned to destination clusters 696 and 694, respectively. Finally, at step 724 label VC-k may be assigned to the destination cluster that is k hops away.

Returning to step 712, if the path does not include a node from the same cluster, the method proceeds to step 714. For example, the clockwise link from node 612 does not include a node from the same cluster 690. At step 714, the link from the first node to an adjacent node may be divided into M virtual channels. Next at step 716, each of M virtual channels may be assigned to one of M destination clusters in a one-to-one correspondence. Finally, at step 718 label VC-k may be assigned to the virtual channel assigned to the destination cluster that is k hops away.

Steps 710-718 may be illustrated via an example. Referring to FIG. 6 at node 612, the maximum path length in the clockwise direction is two because flits from node 612 may be destined for cluster 694 using shortest-path routing, a cluster that is two clusters from the cluster containing node 612. Thus, M=2 from step 710 for node 612. At step 712, the clockwise path from node 612 does not include any nodes from the same cluster containing node 612, so the method proceeds to step 714. At step 714, the clockwise link 650 may be divided into M=2 virtual channels 652a and 654a. Next in step 716, virtual channel 652a may be assigned to destination cluster 694 and virtual channel 654a may be assigned to destination cluster 692. Finally in step 718, label VC-2 may be assigned to virtual channel 652a and consequently destination cluster 694, and label VC-1 may be assigned to virtual channel 654a and consequently destination cluster 692.

Assigning flits to virtual channels in a ring network with clusters of nodes may be similar to the embodiment in FIG. 4, except that in step 412, a flit is assigned to VC-k if the destination cluster, as opposed to the destination node, is k hops away, where the number of hops is measured as number of hops from one cluster to another cluster. Further, one method of routing flits between clusters may be similar to the embodiment in FIG. 5, where the steps may be applied at the cluster level. The steps of receiving and transmitting flits in 510 and 514 may refer to receiving a flit at a cluster and transmitting the flit from the cluster. The receiving step may be performed at one node within a cluster, and the transmitting step may be performed at another node within the cluster.

In FIGS. 6 and 7, it may be assumed that shortest-path routing based on a number of cluster-to-cluster hops may be employed in rings with clusters of nodes. An alternative routing in rings with clusters of nodes may be possible in which a shortest path may be determined by a number of node-to-node hops, instead of a number of cluster-to-cluster hops. A virtual channel may be assigned to a destination cluster if the destination cluster contains a node in a maximum-length path, which is a path with a maximum number of node-to-node hops to reach a destination cluster using shortest-path routing.

In some embodiments, virtual channel assignments based on shortest-path routing with node-to-node hops may lead different numbers of virtual channels than virtual channel assignments based on shortest-path routing with cluster-to-cluster hops. By way of illustration, if shortest path routing based on node-to-node hops is used in the ring network 600 in FIG. 6, node 616, for example, may communicate with three clusters in a clockwise direction, as node 626 may be considered to be in a maximum-length path. Thus, an additional virtual channel may need to be assigned at node 616 in a clockwise direction for packets destined for cluster 698.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising: a plurality of nodes; and a plurality of links connecting the nodes in a ring topology, wherein a first node from among the plurality of nodes is coupled to a first link from among the plurality of links, wherein a second link from among the plurality of links couples the first node from amongst the plurality of nodes to a second node from amongst the plurality of nodes, wherein the first link comprises a plurality of virtual channels, wherein each of the plurality of virtual channels is assigned to provide service to a destination node from among a plurality of destination nodes, wherein a first identifier is assigned to a first virtual channel from among the plurality of virtual channels, wherein the first identifier assigned to the first virtual channel indicates the number of hops from the first node to an assigned serviced destination node from among the plurality of destination nodes, wherein the second link comprises a second virtual channel that is identified using a second identifier that represents a second number of hops from the second node to the assigned service destination node, and wherein the first node is configured to: decrement the second identifier by one; assign a flit to the first virtual channel from among the plurality of virtual channels using the first identifier that equals the second identifier decremented by one; and transmit the flit via the first virtual channel toward the assigned service destination node.

2. The apparatus of claim 1, wherein the plurality of nodes includes the plurality of destination nodes, and wherein each virtual channel is assigned to provide service to one of the destination nodes such that there is a one-to-one correspondence between the virtual channels and the destination nodes.

3. The apparatus of claim 1, wherein the first node is configured to:
assign a flit to the first virtual channel based upon a determination that the flit's destination is the assigned serviced destination node using the first identifier; and
transmit the flit via the first virtual channel toward the assigned serviced destination node.

4. The apparatus of claim 1, wherein the first node is configured to allocate a separate buffer for each of the virtual channels within the first link.

5. The apparatus of claim 1, wherein the plurality of nodes and the plurality of links are located on a network-on-chip, and wherein a flit that enters the network-on-chip is a segment of a network-level packet.

6. The apparatus of claim 1, wherein the number of virtual channels located within the first link is equal to a maximum path length for the ring topology.

7. A method implemented on a single chip, the method comprising: receiving a flit, at a first node located on a single chip, via a first virtual channel from a second node located on the single chip, wherein the first virtual channel is labeled with a first identifier; determining a k value using the first identifier; decrementing k value by one; assigning, at the first node, the flit to a virtual channel that is assigned to provide service to a destination node located on the single chip; and transmitting, at the first node, the flit via the virtual channel towards the destination node, wherein the k value equals the number of node hops from the second node to the destination node, and wherein the virtual channel is assigned a label that is based on the decremented k value that represents a number of node hops within the single chip between the first node and the destination node.

8. The method of claim 7, further comprising assigning a plurality of second virtual channels associated with the first node to a plurality of second destination nodes within the single chip such that each of the second virtual channels is configured to transport traffic to a separate second destination node.

9. The method of claim 8, wherein each of the second virtual channels and the virtual channel is configured to carry traffic destined only for its corresponding destination node.

10. The method of claim 8, wherein the single chip is configured to form a ring topology amongst the first node, the destination node, and the second destination nodes, and wherein the first node, the destination node, and the second destination nodes are interconnected with bidirectional links.

11. The method of claim 8, wherein an oversubscription of a buffer for the virtual channel does not reduce the service rate of the second virtual channels used to transport traffic to the second destination nodes.

12. The method of claim 7, wherein a number of virtual channels associated with a first link used to transport the flit from the first node to the destination node is equal to a maximum number of node hops used to reach a farthest destination node located on the single chip from the first node.

13. An apparatus comprising: a plurality of clusters; and a plurality of links connecting the clusters in a ring topology, wherein a first node, within a first cluster from among the plurality of clusters, is connected to a first link from among the plurality of links, wherein a second link from among the plurality of links couples the first node within the cluster to a second cluster, wherein the first link comprises a plurality of virtual channels, wherein a first virtual channel from among the plurality of virtual channels is assigned to provide service to a first destination cluster, wherein a first identifier is assigned to the first virtual channel such that the first identifier represents the number of hops from the first cluster to the first destination cluster, wherein the second link is associated with a second virtual channel that is identified using a second identifier that represents a second number of hops from the second cluster to the first destination cluster, wherein the first node is configured to: decrement the second identifier by one; assign a flit to the first virtual channel from among the plurality of virtual channels based on the determination that the first identifier equals the second identifier decremented by one; and transmit the flit via the first virtual channel toward the first destination cluster, and wherein the first destination cluster and the first cluster each comprise at least two nodes.

14. The apparatus of claim 13, wherein a plurality of nodes within an on-chip network is divided amongst the clusters, wherein each of the clusters comprise at least two nodes from the plurality of nodes, and wherein each virtual channel is assigned to provide service to a different cluster from among the plurality of clusters such that there is a one-to-one correspondence between virtual channels and clusters.

15. The apparatus of claim 13, wherein the first node comprises a plurality of buffers, wherein each of the buffers are assigned to different virtual channels, and wherein the virtual channels are not labeled to uniquely identify a plurality of destination nodes within one or more clusters.

16. The apparatus of claim 13, wherein the clusters and links are located within, and wherein a flit that enters the chip is formed by segmenting data packets.

17. The apparatus of claim 13, wherein the number of virtual channels dedicated for the first link is equal to a maximum path length amongst the clusters for the ring topology plus one.

* * * * *